Aug. 1, 1961 R. J. GASS 2,994,545
TILTABLY STEERABLE TWO-WHEELED SCOOTER
Filed Dec. 18, 1959
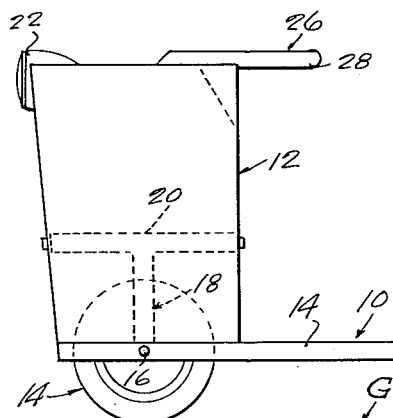
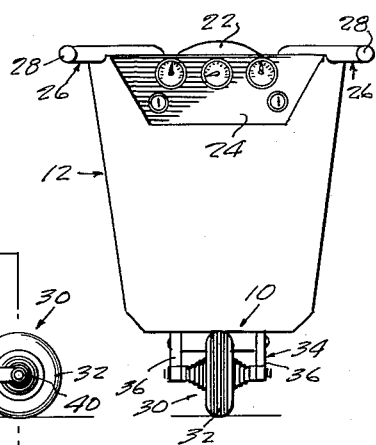
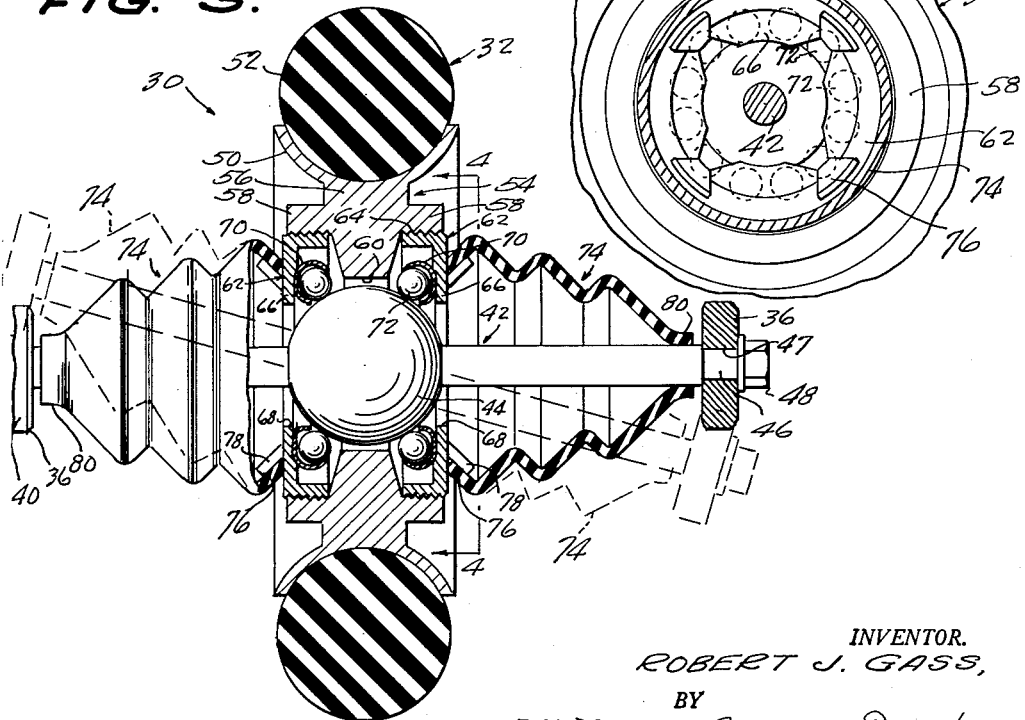
INVENTOR.
ROBERT J. GASS,
BY
McMorrow, Berman & Davidson
ATTORNEYS.

United States Patent Office 2,994,545
Patented Aug. 1, 1961

2,994,545
TILTABLY STEERABLE TWO-WHEELED SCOOTER
Robert J. Gass, 18 Daley St., New Hyde Park, N.Y.
Filed Dec. 18, 1959, Ser. No. 860,428
8 Claims. (Cl. 280—87.04)

This invention relates to a novel two-wheeled scooter which is steered by controlled tilting of the scooter in the direction of a turn.

The primary object of the invention is the provision of a scooter of the kind indicated which is safer and more manageable, and is more fun for children to use, and which is structurally and mechanically superior.

Another object of the invention is provide a simple and inexpensive scooter of the character indicated above wherein the tiltable steering of the scooter is obtained by the provision of a tiltable and castering rear wheel for the scooter, so as to eliminate the dangerous jack-knifing tendency present in front wheel steered two-wheel scooters.

A further object of the invention is the provision, in a scooter of the character indicated above, of a resilient tiltable wheel and axle assembly of efficient and advanced construction, which is free-running, durable, and dirt and weather-proof.

Other important objects and advantageous features of the invention will be apparent from the following description and the accompanying drawings, wherein, for purposes of illustration only, a specific form of the invention is set forth in detail.

In the drawings:

FIGURE 1 is a left-hand side of a scooter of the present invention;

FIGURE 2 is a rear end elevation of FIGURE 1;

FIGURE 3 is an enlarged fragmentary vertical transverse section taken on the line 3—3 of FIGURE 1; and FIGURE 4 is a fragmentary vertical section taken on the line 4—4 of FIGURE 3.

Referring in detail to the drawings, wherein like numerals designate like parts throughout the several views, the illustrated scooter comprises a forwardly and rearwardly elongated horizontal rigid frame 10, upon whose forward end portion is suitably and fixedly mounted a hollow upstanding body 12, the main portion 14 of the frame 10, behind the body 12 being a riding step, upon which the rider stands with one foot while propelling the scooter by application of the other foot to the ground, in the usual way.

The lower part of the body 12 is open to receive the upper part of a relatively large diameter front wheel 14 of relatively wide tread, which is rigidly journaled, as indicated at 16, in a fork assembly 18, which involves part of the forward part of the frame 10, and an upstanding brace structure 20 located within and fixed to the body 12.

The body 12 can be equipped in any suitable attractive manner, as with a headlight 22 facing forwardly at the upper end of the body, and a simulating dial-equipped instrument panel 24 at the upper end of the back of the body. Importantly, there are suitably fixed on the upper end of the body 12, a pair of rearwardly extending and relatively widely rearwardly divergent handle bars 26. The rear ends 28 of the handle bars 26 designedly are spread apart at a relatively great distance, and reach beyond the opposite sides of the body 12, in order to provide the widest practical lateral reach of the handle bars, for the purpose of providing relatively great leverage for easy and controlled tilting of the scooter, to either side from an erect position, for steering the scooter, as hereinafter described.

The frame 10 is devised to assume a horizontal position, parallel to the ground G, as shown in FIGURE 1, in the operation of the scooter, despite the scooter's having a tiltable and castering rear wheel assembly 30, whose wheel 32 is preferably substantially smaller in diameter than the relatively large diameter front wheel 14. The rear wheel 32 is of such reduced diameter in order to provide for more controllable tilting thereof and in order that the rear wheel should not extend substantially above the frame 10 and present hazard to riders as an obstruction to mounting the scooter.

The assembly 30 is mounted at the rear end of a rear frame fork 34 which declines rearwardly relative to the frame 10, and preferably comprises rearwardly extending, laterally spaced, rigid side bars 36 which are suitably fixed, at their forward ends, as indicated at 38, to the rear end part of the frame, and have terminal rear ends 40 which are on a level spaced below the frame 10.

The assembly 30 comprises, as shown in detail in FIGURE 3, a horizontal transverse axle shaft 42 which has a fixed, and preferably integral enlarged spherical bearing 44 at its middle, and reduced ends 46. The reduced ends 46 are engaged through openings 47 provided in the terminal ends 40 of the fork bars 36, and nuts 48 are threaded on the ends 46 against the outward sides of the bars 36. The rear wheel 32 preferably has a concave rim 50, in which a resilient tire 52 is secured, and a rigid and preferably solid annular body 54 which spacedly surrounds the spherical bearing 44.

The rear wheel body 54 comprises a felly portion 56 which has internally threaded annular laterally extending flanges 58 thereon, which are located intermediate and are radially and concentrically spaced from the rim 50 and the inward edge 60 of the felly portion. The edge 60 defines a circular central opening in the wheel body 54 which is concentrically spaced from the surface of the spherical bearing 44, with the body 54 located in a diametrical plane of the bearing 44.

The rear wheel 32 is rotatably and tiltably mounted on the spherical bearing 44 by means of a dual anti-friction bearing assembly, which preferably comprises a pair of similar inwardly facing annular cup-shaped bearing housings 62 which comprise peripheral walls 64 which are suitably secured in the flanges 58, as by screw-threading, as indicated at 64, and flat bottom walls 66 which are located at opposite sides of the bearing 44, and have axial openings 68 large enough to provide for wide angle tiltings of the axle shaft 42 relative to the housings 62 and the rear wheel 32.

Suitably fixed on the inward surfaces of the housing bottom walls 66 and canted toward the spherical bearing 44, are ball races 70 which contain ball bearings 72 which engage the surface of the bearing 44 at locations spaced radially inwardly from the inward edge 60 of the felly portion 56, whereby the edge 60 is maintained concentrically spaced from the bearing 44, in the erect and in tilted positions of the rear wheel 32.

For yieldably resisting tiltings and castering of the rear wheel 32 and tending to return the rear wheel toward erect and straight forward position from tilted and castered positions, resilient axially outwardly tapered bellows sleeves 74 are provided, which surround related portions of the axle shaft 42, at opposite sides of the wheel 32, and which also serve to keep out dirt and weatherproof the bearings, bearing housings, and spherical bearing.

The sleeves 74 have at their larger inward ends inwardly angled annular lips 76 which are securably engaged over fixed, circumferentially spaced, outwardly angled lugs 78 on the outward surfaces of the bearing housing bottom walls 66. The smaller outward ends of the sleeves 74 have annular collars 80 which snugly and rotatably receive related portions of the axle shaft 42, at locations close to the rear fork side bars 36. With this arrangement, the wheel 32 and the sleeves 74 rotate together on the axle shaft 42, and, in the erect position of the wheel 32 the sleeves 74 are under minimal or no endwise compression. However, when the scooter frame 10 is tilted toward either side by a rider standing thereon and gripping the handle bars 26, the axle shaft 42 is correspondingly tilted in the same direction, so that the sleeve 74, at the down-tilted side, is compressed endwise and the other sleeve is relaxed and not compressed.

As for example, the frame 12, and hence the axle shaft 42, is thus tilted downwardly toward the right, as indicated in phantom lines in FIGURE 3, the wheel 32 tends to erect itself and caster toward the opposite side of the frame 12 and follow the straight line forward travel of the scooter, but in so doing, becomes horizontally angled or castered toward the left of such line of travel and toward the left-hand side of the frame 12, and thereby produces travel of the scooter in a right-hand turn. A left-hand turn of the scooter is similarly produced by a left-hand tilting of the frame 12 by a rider. When the frame 12 is erected by the rider, the sleeve 74 compressed in the operation tends to forcibly return the wheel 32 to erect and straight forward position, which supplements the wheel's own tendency so to do.

The wide rearward angling and spacing of the handle bars 26 gives the rider of the scooter maximum leverage for easily and controllably, and hence, safely tilting the scooter and returning the same to erect position.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A two-wheeled scooter comprising a rigid horizontal frame, a front wheel fixed to the frame at its forward end, and a rear wheel, a horizontal axle fixed at its ends to and extending crosswise of the frame, said rear wheel having a hub structure circumposed on and rotatably and tiltably supported on the axle.

2. A two-wheeled scooter comprising a horizontally elongated rigid frame having front and rear ends, a front wheel fixedly mounted on the frame at said front end, and a rear wheel flexibly mounted on the frame at the rear end thereof, to tilt and caster to opposite sides of the frame as the frame is tilted toward either side, a fork fixed on the frame and extending rearwardly therefrom, said fork having a rear end depressed below the level of the frame on which the rear wheel is mounted.

3. A two-wheeled scooter comprising a horizontally elongated rigid frame having front and rear ends, a front wheel fixedly mounted on the frame at said front end, and a rear wheel flexibly mounted on the frame at the rear end thereof, to tilt and caster to opposite sides of the frame as the frame is tilted toward either side, a fork fixed on the frame and extending rearwardly therefrom, said fork having a rear end depressed below the level of the frame on which the rear wheel is mounted, said rear wheel being substantially smaller in diameter than the front wheel and having its top not substantially above the level of the frame.

4. A two-wheeled scooter comprising a horizontally elongated rigid frame having front and rear ends, a front wheel fixedly mounted on the frame at said front end, and a rear wheel flexibly mounted on the frame at the rear end thereof, to tilt and caster to opposite sides of the frame as the frame is tilted toward either side, a rearwardly declining fork fixed on the frame and extending rearwardly therefrom, said fork having a rear end depressed below the level of the frame on which the rear wheel is mounted.

5. A two-wheeled scooter comprising a horizontally elongated rigid frame having front and rear ends, a front wheel fixedly mounted on the frame at said front end, and a rear wheel flexibly mounted on the frame at the rear end thereof, to tilt and caster to opposite sides of the frame as the frame is tilted toward either side, a rearwardly declining fork fixed on the frame and extending rearwardly therefrom, said fork having a rear end depressed below the level of the frame on which the rear wheel is mounted, said rear wheel being substantially smaller in diameter than the front wheel and having its top not substantially above the level of the frame.

6. A two-wheeled scooter having a horizontal frame having front and rear ends, a front wheel fixedly mounted on the frame at said front end, a rear wheel assembly means mounting said assembly on and in a position behind the rear end of the frame, said rear wheel assembly comprising a horizontal transverse axle shaft having ends fixed to the fork, said shaft having an enlarged spherical bearing at its middle, a rear wheel having an annular body spacedly and concentrically surrounding the spherical bearing, and anti-friction bearing means mounting the wheel body on the spherical bearing to tilt laterally to opposite sides and caster relative to the axle shaft.

7. A two-wheeled scooter having a horizontal frame having front and rear ends, a front wheel fixedly mounted on the frame at said front end, a rear wheel assembly means mounting said assembly on and in a position behind the rear end of the frame, said rear wheel assembly comprising a horizontal transverse axle shaft having ends fixed to the fork, said shaft having an enlarged spherical bearing at its middle, a rear wheel having an annular body spacedly and concentrically surrounding the spherical bearing, and anti-friction bearing means mounting the wheel body on the spherical bearing to tilt laterally to opposite sides and caster relative to the axle shaft, said wheel body having laterally extending annular flanges thereon and said bearing means comprising annular bearing houses secured in the flanges, ball races on the facing sides of said housings, and ball bearings confined in the races and bearing against the top and bottom at related sides of the spherical bearing.

8. A two-wheeled scooter having a horizontal frame having front and rear ends, a front wheel fixedly mounted on the frame at said front end, a rear wheel assembly means mounting said assembly on and in a position behind the rear end of the frame, said rear wheel assembly comprising a horizontal transverse axle shaft having ends fixed to the fork, said shaft having an enlarged spherical bearing at its middle, a rear wheel having an annular body spacedly and concentrically surrounding the spherical bearing, and anti-friction bearing means mounting the wheel body on the spherical bearing to tilt laterally to opposite sides and caster relative to the axle shaft, said wheel body having laterally extending annular flanges thereon and said bearing means comprising annular bearing houses secured in the flanges, ball races on the facing sides of said housings, and ball bearings confined in the races and bearing against the top and bottom at related sides of the spherical bearing, and resilient sleeves surrounding the axle shaft at opposite sides of the wheel, said sleeves having inward ends secured to the bearing houses and outward ends having collars thereon which are journalled on the axle shaft at the outer ends thereof and can bear against said fork for compressing sleeves between the fork and the bearing houses as the axle shaft is tilted to either side of the frame.

References Cited in the file of this patent

UNITED STATES PATENTS

| | | |
|---|---|---|
| D. 178,134 | Maher | June 26, 1956 |
| 1,147,566 | Taylor | July 20, 1915 |
| 2,027,254 | Vogt | Jan. 7, 1936 |
| 2,045,983 | Ferrigno | June 30, 1936 |
| 2,282,589 | Mayne | May 12, 1942 |
| 2,330,147 | Rodriguez | Sept. 21, 1943 |
| 2,560,562 | Ferwerda | July 17, 1951 |